(12) United States Patent
Batiste et al.

(10) Patent No.: US 8,894,781 B2
(45) Date of Patent: *Nov. 25, 2014

(54) METHOD AND APPARATUS FOR TREATING A STEEL ARTICLE

(71) Applicant: Buffalo Armory LLC, Buffalo, NY (US)

(72) Inventors: John Batiste, Rochester, NY (US); Todd Zyra, Brockport, NY (US); Brent Nicholson, Lockport, NY (US); Jim Sloan, Lima, NY (US); Brad Cooper, Rochester, NY (US); John Sparling, Livonia, NY (US); Mark Turek, Depew, NY (US); Mike Haselkorn, Fairport, NY (US)

(73) Assignee: Buffalo Armory LLC, Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/949,645

(22) Filed: Jul. 24, 2013

(65) Prior Publication Data

US 2014/0261902 A1 Sep. 18, 2014

Related U.S. Application Data

(63) Continuation of application No. 13/838,693, filed on Mar. 15, 2013.

(60) Provisional application No. 61/661,540, filed on Jun. 19, 2012.

(51) Int. Cl.
*C21D 1/18* (2006.01)
*C21D 1/78* (2006.01)
*B23K 31/02* (2006.01)
*C21D 1/42* (2006.01)

(52) U.S. Cl.
CPC . *C21D 1/78* (2013.01); *B23K 31/02* (2013.01); *C21D 1/18* (2013.01); *C21D 1/42* (2013.01)
USPC .......................................... 148/624; 148/638

(58) Field of Classification Search
CPC .... C21D 1/185; C21D 8/0226; C21D 8/0263; C21D 8/0273
USPC ................................................... 148/624, 638
See application file for complete search history.

(56) References Cited

U.S. PATENT DOCUMENTS 4,880,477 A 11/1989 Hayes et al.
7,909,505 B2 3/2011 Alexandrov
(Continued)

FOREIGN PATENT DOCUMENTS

JP 11012678 1/1999

OTHER PUBLICATIONS

Alexandrov, A New Methodology for Studying Phase Transformations in High Strength Steel Weld Metal, Proceedings of the 7th International Conference on Trends in Welding Research, May 16-20, 2005, 975-980, ASM International, Pine Mountain, Georgia, USA.

(Continued)

*Primary Examiner* — Jie Yang
(74) *Attorney, Agent, or Firm* — Hahn, Loeser & Parks LLP; Arland T Stein (57) ABSTRACT

A method for forming and treating a steel article of a high strength and high ductility alloy particularly suited for use as armor plate. The method includes the steps of providing a starting material for the steel article, heating the starting material to a peak temperature range in less than ten seconds, holding the heated steel composition at the peak temperature range for between two and six seconds, quenching the heated steel composition from the peak temperature range to below 100° C. (212° F.) at a temperature rate reduction of 400 and 3000° C./sec (752 and 5432° F./sec), removing residual quench media from the surface of the quenched steel composition, tempering the quenched steel composition at a temperature of 100 to 260° C. (212 to 500° F.); and air cooling the tempered steel composition to less than 100° C. (212° F.) to form a steel having desired mechanical properties.

27 Claims, 9 Drawing Sheets

(56) References Cited

U.S. PATENT DOCUMENTS

| | | |
|---|---|---|
| 8,480,824 B2 | 7/2013 | Cola, Jr. et al. |
| 2001/0015245 A1 | 8/2001 | Eberle et al. |
| 2001/0030004 A1 | 10/2001 | Kushida et al. |
| 2004/0112484 A1 | 6/2004 | Saito et al. |
| 2004/0247927 A1 | 12/2004 | Kurz |
| 2005/0071980 A1 | 4/2005 | Rasmussen et al. |
| 2010/0132854 A1 | 6/2010 | Cola, Jr. |
| 2010/0163140 A1 | 7/2010 | Cola, Jr. |
| 2011/0197745 A1 | 8/2011 | Locke |
| 2011/0226386 A1 | 9/2011 | Roch |
| 2013/0333811 A1* | 12/2013 | Batiste et al. ............. 148/529 |

OTHER PUBLICATIONS

Muljono High-Rate Induction Annealing of Cold Rolled Low Carbon Steel Sheet, 39th Mechanical Working and Steel Processing Conference Proceedings, Oct. 19-22, 1997, 667-672, vol. XXXV, Charles E. Slater, Indianapolis, Indiana, USA.

Blanzy, Microstructural Evolution and Mechanical Properties of Induction Heated Low Carbon Sheet Steel, 43rd Mechanical Working and Steel Processing Conference, 2001, 805-812, vol. XXXIX, Iron and Steel Society, Warrendale, PA.

Alexandrov, Non-Equilibrium Phase Transformation Diagrams in Engineering Alloys, Trends in Welding Research, Proceedings of the 8th International Conference, 2009, 467-476, ASM International, Materials Park, Ohio, USA.

Clarke, The Effect of Heating Rate and Prior Microstructure on Austenitization Kinetics of 5150 Hot-Rolled and Quenched and Tempered Steel, Steel: Steel Product Metallurgy and Applications, Sep. 16-20, 2007, 367-382, Materials Science and Technology, Detroit, Michigan, USA.

Lolla, Development of rapid heating and cooling (flash processing) process to produce advanced high strength steel microstructures, Materials Science and Technology, May 2011, 863-875 vol. 27, No. 5, Maney Publishing, Philadelphia, Pennsylvania, USA.

International Search Report for PCT/US 13/46506, Mailed Nov. 1, 2013.

* cited by examiner

METHOD AND APPARATUS FOR TREATING A STEEL ARTICLE

RELATED APPLICATIONS

This application claims priority to U.S. Provisional Application No. 61/661,540 filed Jun. 19, 2012, the contents of which are hereby incorporated in their entirety. This application is a continuation of and also claims priority to U.S. Nonprovisional patent application Ser. No. 13/838,693 filed Mar. 15, 2013, the contents of which are hereby incorporated in their entirety.

BACKGROUND AND SUMMARY

This invention relates to the heat treatment of steel articles, and in particular relates to induction heating, quenching, and tempering of steel sheets.

In order to improve the mechanical properties of metal articles, metal is typically subjected to time consuming, and therefore costly, heat treatment processes. To increase the hardness of a steel, a steel article may be subjected to a heating cycle at or above a temperature of the metal's critical temperature, followed by quenching the metal article. This process typically results in creation of a martensitic microstructure in steels. Martensitic microstructures, while very hard, are also known to be relatively brittle, i.e., having little ductility. To increase the ductility of martensitic microstructures, such steels are often tempered, or heated to a temperature below the steel's critical temperature, whereby stresses built up in the steel during quenching are reduced. Such heating, quenching, and tempering processes are typically long to conduct, and accordingly, expensive.

In processing steel generally, and, more specifically, in forming anti-ballistic armor, it has until now been difficult to achieve a metal product having a combination of strength and ductility which could be manufactured without high cost, including extensive heat treatment time. For example, such a metal article should be able to resist penetration by armor piercing ammunition as well as fragments from improvised explosive devices, including explosively formed projectiles. We have found a method and apparatus for heat treating, quenching, and tempering a steel article whereby the article has desirable mechanical and microstructure properties, including properties which may be useful in acting as anti-ballistic armor or in other applications which may require a steel sheet having high hardness in combination with high ductility.

Disclosed is a method for treating a steel article to form a high hardness and high ductility alloy comprising the steps of:

(a) providing a steel composition having a material thickness less than 0.5 inches (12.7 mm), having an initial microstructure of ferrite and pearlite, and having a composition of, by weight,
 carbon between 0.25 and 0.55%,
 silicon between 0.15 and 0.35%,
 manganese between 0.40 and 1.0%,
 chromium between 0.80 and 1.10%,
 molybdenum between 0.15 and 0.25%,
 sulfur less than 0.040%,
 phosphorus less than 0.035%;

(b) preheating the provided steel composition at least 0.7° C. (33.3° F.) per second to not more than 538° C. (1000° F.);

(c) heating the provided steel composition to a peak temperature of between 850° C. (1562° F.) and 1150° C. (2102° F.) in less than ten seconds;

(d) holding the heated steel composition at a temperature within the peak temperature range for between two and ten seconds;

(e) quenching the heated steel composition from the peak temperature range to below 100° C. (212° F.) at a temperature rate reduction of between 400 and 3000° C./sec (752-5432° F./sec);

(f) removing residual quench media from the surface of the quenched steel composition;

(g) tempering the quenched steel composition at a temperature from 100° C. to 260° C. (212-500° F.) for less than ninety minutes;

(h) air cooling the tempered steel composition to less than 100° C. (212° F.) to form a steel article having a transformed microstructure at least 80% martensite and up to 5% bainite, a yield strength of at least 1800 MPa, a total elongation between 5% and 12%, and having a $V_{50}$ protection ballistic limit at 30° obliquity angle between 2200 and 2700 feet per second (670-823 m/s) with a .30 caliber armor piercing round for a thickness of 0.25" (6.35 mm).

Alternatively, disclosed is a method for treating a steel article to form a high hardness and high ductility alloy comprising the steps of:

(a) providing a steel composition having a material thickness less than 0.5 inches (12.7 mm), having an initial microstructure of ferrite and pearlite, and having a composition of, by weight,
 carbon between 0.25 and 0.55%.
 silicon between 0.15 and 0.35%,
 manganese between 0.40 and 1.0%,
 chromium between 0.80 and 1.10%,
 molybdenum between 0.15 and 0.25%,
 sulfur less than 0.040%,
 phosphorus less than 0.035%;

(b) preheating the provided steel composition at least 0.7° C. (33.3° F.) per second to between the austenization temperature and 815° C. (1500° F.);

(c) heating the provided steel composition to a peak temperature of between 850° C. (1562° F.) and 1150° C. (2102° F.) in less than ten seconds;

(d) holding the heated steel composition at a temperature within the peak temperature range for between two and sixty seconds;

(e) quenching the heated steel composition from the peak temperature range to below 100° C. (212° F.) at a temperature rate reduction of between 400 and 3000° C./sec (752-5432° F./sec);

(f) removing residual quench media from the surface of the quenched steel composition;

(g) tempering the quenched steel composition at a temperature from 100° C. to 260° C. (212-500° F.) for less than ninety minutes;

(h) air cooling the tempered steel composition to less than 100° C. (212° F.) to form a steel article having a transformed microstructure at least 80% martensite and up to 5% bainite, a yield strength of at least 1800 MPa, a total elongation between 5% and 12%, and having a $V_{50}$ protection ballistic limit at 30° obliquity angle between 2200 and 2700 feet per second (670-823 m/s) with a .30 caliber armor piercing round for a thickness of 0.25" (6.35 mm).

Also disclosed is a method for treating a steel article to form a high strength and high ductility alloy comprising the steps of:

(a) providing a steel composition having a material thickness less than 0.5 inches (12.7 mm), having an initial microstructure of ferrite and pearlite, and having a composition of, by weight, carbon between 0.25 and 0.55%
silicon between 0.15 and 0.35%,
manganese between 0.40 and 1.0%,
chromium between 0.80 and 1.10%,
molybdenum between 0.15 and 0.25%,
sulfur less than 0.040%,
phosphorus less than 0.035%;

(b) preheating the provided steel composition to a temperature between 260° C. (500° F.) and 538° C. (1000° F.).

(c) heating the preheated steel composition to a peak temperature of between 850° C. (1562° F.) and 1150° C. (2102° F.) in less than ten seconds;

(d) holding the heated steel composition at the peak temperature range for between two and sixty seconds;

(e) quenching the heated steel composition from the peak temperature range to below 100° C. (212° F.) at a temperature rate reduction of between 400 and 3000° C./sec (752-5432° F./sec);

(f) removing residual quench media from the surface of the quenched steel composition;

(g) tempering the quenched steel composition at a temperature from 100° C. to 260° C. (212-500° F.) for less than ninety minutes;

(h) air cooling the tempered steel composition to less than 100° C. (212° F.) to form a steel article having at least 80% martensite and up to 5% bainite, a yield strength of at least 1800 MPa, a total elongation between 5% and 12%, and having a $V_{50}$ protection ballistic limit at 30° obliquity angle between 2300 and 2510 feet per second (701-765 m/s) with a .30 caliber armor piercing round for a thickness of 0.25" (6.35 mm).

Alternatively, disclosed is a method for treating a steel article to form a high strength and high ductility alloy comprising the steps of:

(a) providing a steel composition having a material thickness less than 0.5 inch (12.7 mm), having an initial microstructure of ferrite and pearlite, and having a composition of, by weight,
carbon between 0.25 and 0.55%
silicon between 0.15 and 0.35%,
manganese between 0.40 and 1.0%,
chromium between 0.80 and 1.10%,
molybdenum between 0.15 and 0.25%,
sulfur less than 0.040%,
phosphorus less than 0.035%;

(b) preheating the provided steel composition at least 0.7° C. (33.3° F.) per second to not more than 538° C. (1000° F.);

(c) heating the preheated steel composition to a peak temperature between 850-1150° C. (1562-2102° F.) in less than ten seconds;

(d) holding the heated steel composition at the peak temperature range for between two and sixty seconds;

(e) quenching the heated steel composition to below 100° C. (212° F.) in less than four seconds;

(f) removing residual quench media from the surface of the quenched steel composition;

(g) tempering the quenched steel composition at a temperature between 100° C. and 260° C. (212-500° F.) for less than ninety minutes;

(h) air cooling the tempered steel composition to less than 100° C. (212° F.) having a transformed microstructure of at least 80% martensite and up to 5% bainite, a yield strength of at least 1800 MPa, and a total elongation between 5% and 12%.

Additionally, prior to heating the steel composition, two or more lengths of steel plates may be welded together along the width with one or more welds to form a continuous series of steel plates. Further, the step of welding may include applying a weave weld bridging between lengths of steel plate across the width of the steel plates. Further, the step of welding may include applying a weave weld bridging between lengths of steel plate in three sections where the center portion of steel plate is welded first and the side portions are welded to provide a weave weld across the width of the steel plates. In any event, a seam weld is applied over the weave weld across the width of the steel plates. Further, an indicia may be applied to the steel plate in advance of the welding step to enable a vision system to identify the location of end portions of lengths of the steel plates for the welding step.

During the quenching step, the heated steel composition again may be quenched from the peak temperature range to below 100° C. (212° F.) at a temperature rate reduction of between 400 and 3000° C./second (752-5432° F./sec). In the disclosed method, the quenching step may be performed by flowing a quench medium over the steel article at a rate of up to 900 gallons/min (3400 L/min). In one alternative, the quench medium may be water. Following quenching, the residual quench media may be removed from the surface of the quenched steel composition by at least one of mechanical wiping, blown air, and combinations thereof.

The quenched steel composition may be induction tempered for less than ten minutes, while in one alternative the quenched steel composition may be oven tempered for less than ninety minutes, and in another alternative the quenched steel composition may be tempered by a combination of oven and induction tempering for 30-60 minutes. The quenching step may be, for example, performed in more than 1 second and not more than 20 seconds. In still yet another alternative, the quenched steel composition may be induction tempered for two minutes or less. The tempering step may be performed at between 120° C. (250° F.) and 240° C. (500° F.). After quenching or tempering step, the steel plate may be cut into lengths at least at the seams to make substantially rectangular processed steel product while the steel plate continuously moves along the conveyor.

BRIEF DESCRIPTION OF THE DRAWINGS

FIG. 4 is a plan view of a welding pattern used for joining steel articles to be treated by the disclosed method;

DETAILED DESCRIPTION OF THE DRAWINGS

The present method is directed to an induction heated, quenched, and induction tempered steel article and a method of making such a steel article. The starting material for the steel article has a composition comprising carbon in a range from about 0.25% by weight to about 0.55% by weight, silicon in a range from about 0.15% by weight to about 0.35% by weight, manganese in a range from about 0.40% by weight to about 1.0% by weight, chromium from about 0.80% by weight to about 1.10% by weight, sulfur less than 0.040% by weight, phosphorus less than 0.035% by weight, with the balance of the composition comprising iron and incidental ingredients. Additionally, the steel article may have carbon in a range from about 0.25% by weight to about 0.44% by weight and manganese in a range from about 0.40% by weight to about 0.60% by weight, the other components having the same composition ranges. Steel material having this composition may be referred to as AISI steel grade 4130. Alternatively, the steel article may have carbon in a range from about 0.40% by weight to about 0.55% by weight and manganese in a range from about 0.75% by weight to about 1.00% by weight, the other components having the same composition ranges. Steel material having this composition may be referred to as AISI steel grade 4140. Stated in terms of commercial grades, AISI steel grades from the 10XX family such as 1030,1040 and 1050, the 41XX family such as 4130 and 4150 and the 86XX (family such as 8630 and 8640 may be used. Further, as described above, higher carbon steel grades, such as ultra hard steel having up to 0.55% carbon, may be used with the described invention.

Figure 1:
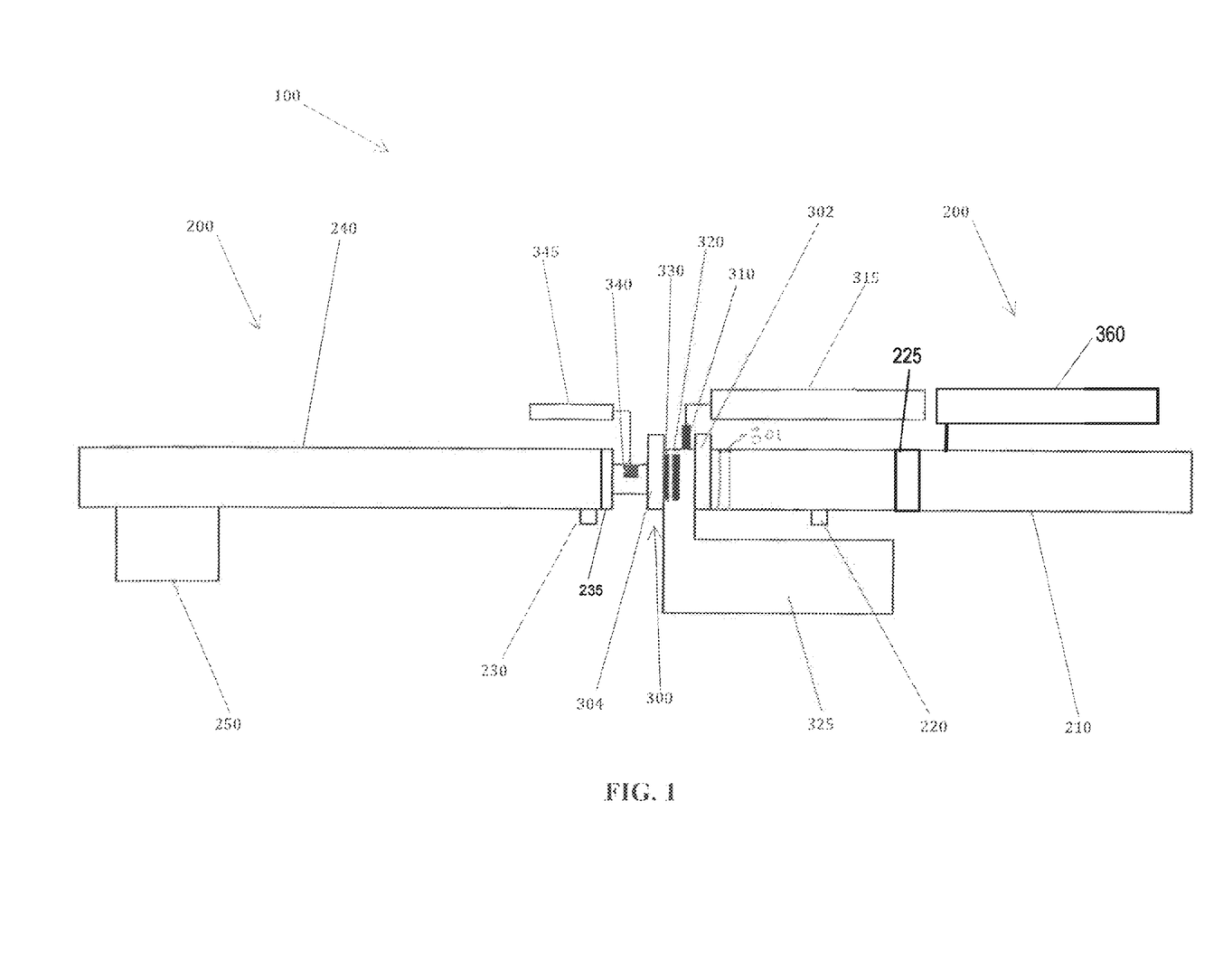
FIG. 1 is a diagrammatical plan view of the heat treatment system of the present disclosure.
Figure 2:
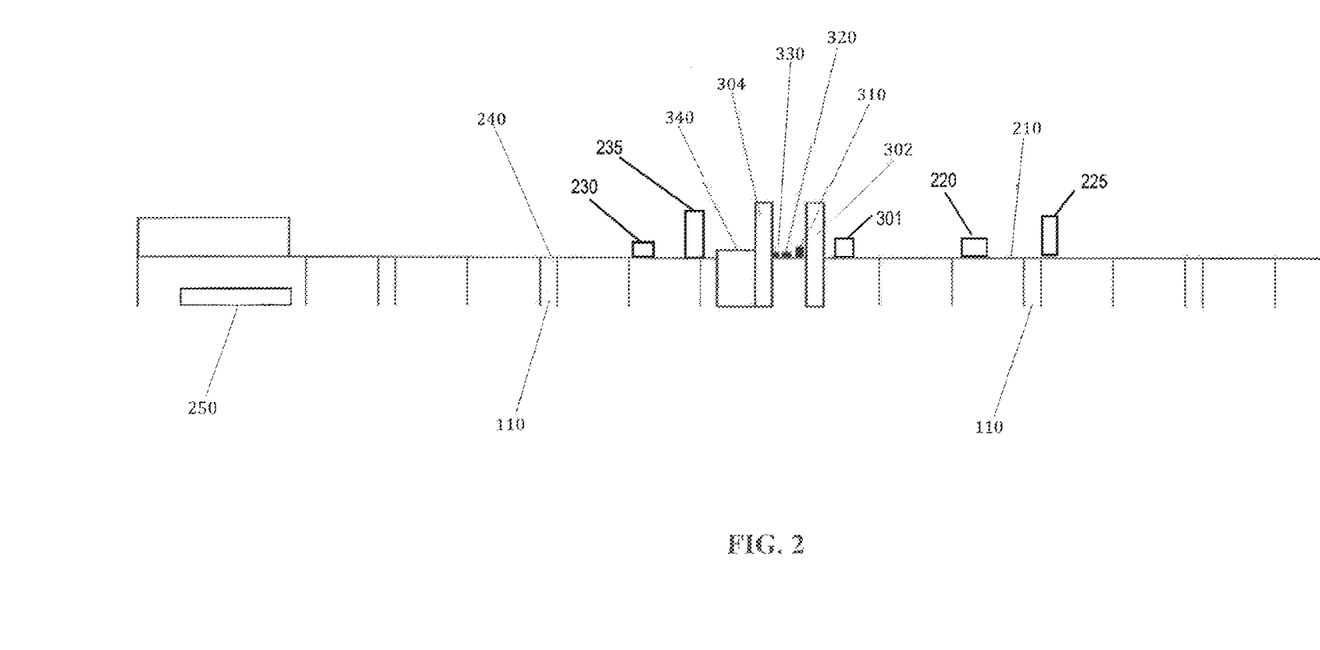
FIG. 2 is a diagrammatical side view of the heat treatment system of FIG. 1.
Figure 5:
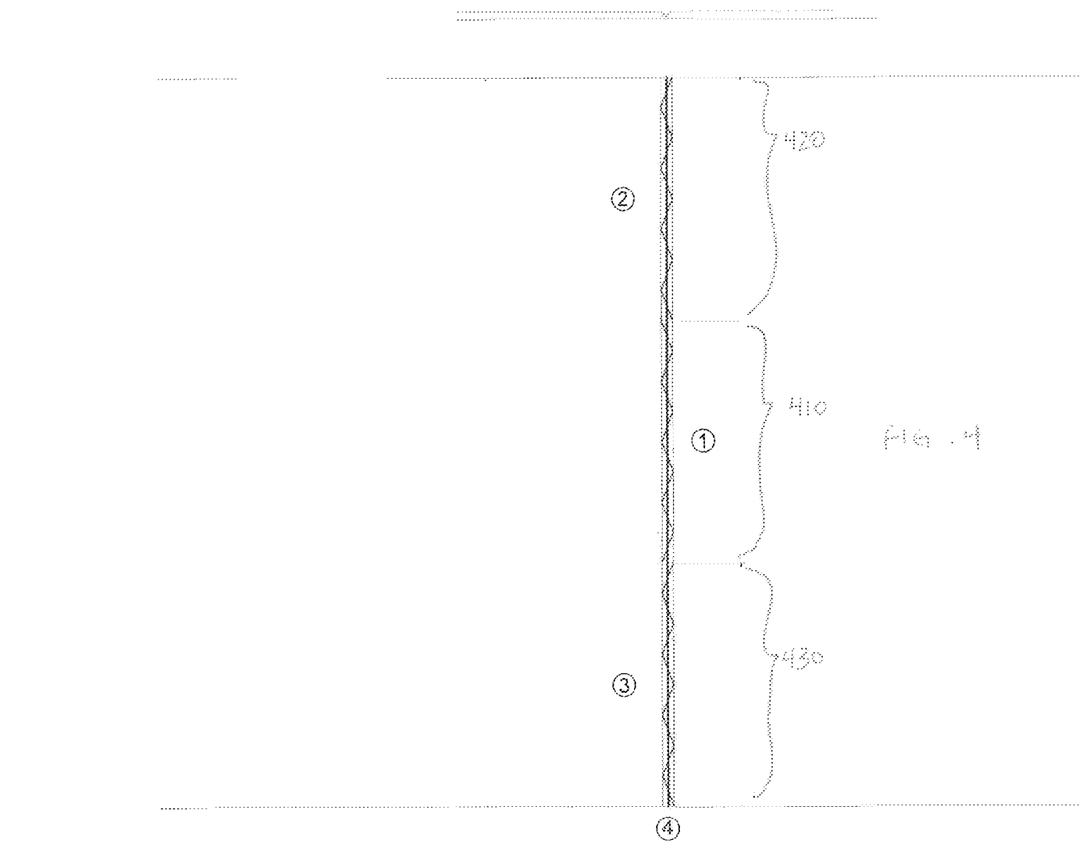
FIG. 5 is a photomicrograph showing the microstructure of a steel article prior to treatment according to the disclosed method.

Referring now to FIGS. 1 and 2, a heat treatment system 100 is illustrated that comprises a main machine frame 110 supported from a factory floor and supporting a discontinuous conveyor 200. The conveyor 200 includes an entrance conveyor 210, where a starting material for a steel article to be treated by the system 100 is loaded, and an exit conveyor 240, where treated steel articles are removed from the system and stacked at stacker 250. The entrance conveyor 210 and the exit conveyor 240 are aligned and spaced apart so as to accommodate the provision of a heat treatment unit 300 in line between the two conveyors 210, 240. The starting material for the steel article is initially provided in the as-cast or as-rolled condition and may be subjected to spheroidized or non-spheroidized annealing heat treatment. When non-spheroidized, the initial material microstructure of the starting material for steel article may have, for example, a non-annealed microstructure combination of ferrite and pearlite as shown in FIG. 5. Depending on the method of manufacturing of the steel article, the initial microstructure may have a banded structure consistent with rolling.

Accordingly, a starting material for a steel article to be treated may be loaded at the entrance conveyor 210, processed by the heat treatment unit 300, transited down the exit conveyor 240, and stacked by the stacker 250, in a continuous process. This linear alignment of the conveyors 210, 240 and the heat treatment unit 300 facilitates rapid heat treatment of steel sheet, slab, and plate.

In operation, a starting material for the steel article to be treated, which may be provided, for example in the form of a sheet or plate, is loaded onto the entrance conveyor 210. The method is described in terms of processing a steel plate to form the steel article, but the form of the starting material in other forms, including without limitation steel slabs and steel sheet, as well as coiled product. In one instance, a starting material for the steel plate has a thickness of 0.50 inches (12.7 mm) or less, a length of 20 feet (6.1 m), and a width of 4 feet (1.2 m). The steel plate then begins to transit horizontally along the length of the entrance conveyor 210 toward the heat treatment unit 300. Once the steel plate has moved a distance approximate to its length, for example 20 feet (6.1 m), down the entrance conveyor 210, another steel plate is loaded on the entrance conveyor with the leading edge portions of that steel plate abutting the trailing edge portions of the first loaded steel plate. This process of advancement and loading of abutting steel plates may be carried out continuously so as to provide an uninterrupted run of steel plates to the heat treatment unit 300. So as to minimize inconsistent alignment from plate to plate through the system 100, an automated welder 220 may be provided on the entrance conveyor 210 and utilized to weld consecutive, abutting steel plates together along their width. The welds may be evenly spaced along the width of the steel plates, and in one instance, the welder may make five welds along the width of the steel plates. Alternatively, instead of in the form of individual plates having fixed width and length, the starting material to be treated may be provided in the form of a continuous sheet (off a coil) located in line with the entrance conveyor 210 and fed continuously onto the entrance conveyor for subsequent treatment by the heat treatment unit 300.

The steel plates may be in continuous motion at a substantially constant speed along the conveyor 210 to facilitate the heating and quenching processes. Welding the steel plates together as they contact on the conveyor 210 prevents the steel plate from shifting position or overlapping each other as they move down the conveyor. This allows a vision system 225 and welding robot 220 to provide a consistent weld joint between lengths of steel plates. It also limits imperfections in the steel plate going through drive pinch rolls 302 and 304, which assists to maintain line speed as the welded seams move through the pinch rolls. Initial welding also allows the system to bridge gaps at the seam between lengths of steel plates, further improving the welding robot weld process.

Figure 3:
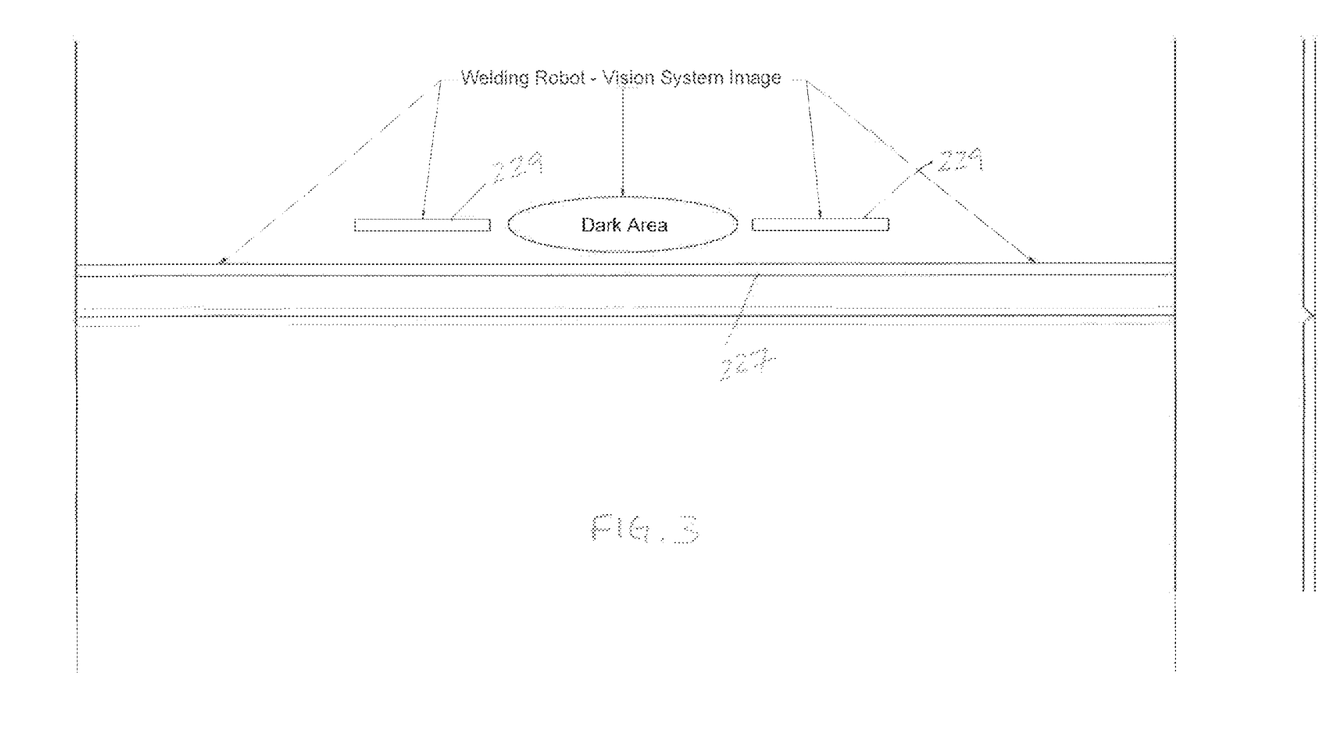
FIG. 3 is a plan view of the pattern marked on a steel article to be treated for detection by a vision system.

The vision system 225 for the welding robot may identify an indicia pattern of lines placed adjacent to the trailing edge of each steel plate, which may, for example, include a line 227 drawn across the full width of the steel plate with two spaced apart smaller lines 229 substantially parallel to that line, and a dark area between spaced apart lines. This is an example of a pattern of indicia that enables for correct position of lengths of steel plates to be recognized by the vision system 225. Once the vision system 225 detects the indicia, it begins counting to signal the welding robot 220 once the steel plate lengths are within the work area and to start the programmed weld process. FIG. 3 illustrates the indicia recognized by the welding robot vision system 225. The vision system 235 for the plasma cutting robot 230 may recognize a position for a welded seam across the full width of the steel plate. The scores and emphasis area of indicia is specific to avoid stray lines on the steel plate to be picked up and mistaken for a weld area. If that were to occur, the plasma cutting robot 230 may cut at that stray lines and disrupt the steel lengths through the system until the next seam is detected.

The welding robot 220 may have a multiple pass program that is triggered by the vision system 225 and encoder wheel that counts distance travelled in millimeters tracking along the conveyor 200, to engage a weld program once the seam is within the robot work area. The robot work area is based on points that are taught or touched on within the welding program. The weld program may utilize three (3) separate welding weave patterns, starting with the center portion of the steel plate 410, moving to first side portion of the steel plate 420, and then to a second side portion of the steel plate as shown FIG. 4. The weave patterns produced may be as shown in FIG. 4 before switching over to a cover pass welding the seam across the full width of the steel plate as also shown in FIG. 4. This multiple pass pattern improves the weld process by first using a weave to bridge any gaps where steel plates meet before the final cover pass. The weave passes also heat the steel plate before the final cover pass, which uses more wire and heat to penetrate the steel plate, thereby strengthening the weld seam so that the continuous steel plate can move through the process without breaking or otherwise becoming misaligned.

The heat treatment unit 300 may include a preheat induction coil 301, a set of entrance pinch rolls 302, which guide the steel plate to be treated through an induction heat coil 310, a quench head 320, and a quench media removal unit 330, until the intermediate treated steel article to be formed from the starting steel plate is received by a set of exit pinch rolls 304. Similarly, the exit pinch rolls 304 serve to guide the steel plate through the induction tempering coil 340 and onto the exit conveyor 240. Optionally, both the entrance pinch rolls 302 and the exit pinch rolls 304 may contain spaced circumferential grooves, preferably equally spaced, corresponding to the spaced welds along the width of the steel plates. Such circumferential grooves provide relief into which any material built up during the welding operation may be recessed as the welded portion of the steel plates pass between the pinch rolls 302 and 304.

Before entering the entrance pinch rolls 302, the steel plate may be preheated in a preheat induction coil 301 while moving along the conveyor 200. The pre-heat power supply may be set, for example, to turn on 75 seconds after starting movement of the steel plate through the conveyor 200. At a conveyor speed of 40 to 50 inches per minute (1.0-1.2 m/min), this involves moving along the conveyor four to five feet (1.2-1.5 m). Once on, the pre-heat power supply 360 may start at 1% and ramp up 0.5-10% per second until it reaches a final power setting of 50-100%. This ramp up involves the steel plate moving another four to five feet of travel along the conveyor 200 before the pre-heat power supply reaches a operating power level where the steel plate may reach a temperature of above 500° C. (932° F.) (e.g., 560° C. (1040° F.)) across the width of the steel plate. The ramp up procedure for the power supply allows substantially evenly and gradually heating the steel plate through induction heating and aids in controlling the shape and flatness of the steel plate with gradual heating to above 500° C. (932° F.) before entry the rapid heating sequence upon entry pinch rolls 302.

The steel plates to be treated pass through the entrance pinch rolls 302 and through an induction heating coil or inductor 310 which is powered by a power supply 315. The induction heating coil 310 may be encased in concrete or other non-conductive material in order to reduce damage to the induction coil as much as possible and reduce misaligned steel plates from passing through the coil, although an non-encased induction heating coil may also be provided. As the steel plate to be treated passes through the induction heating coil 310, an eddy current is induced in the steel plate, and it is the resistance of the steel material in conjunction with the eddy currents which heat the material. Given the configuration of the induction coil 310, the shape of the steel plate passing through the coil, and the speed at which the steel plate is moving through the heating coil, the steel material is heated to a temperature of between 850° C. and 1150° C. (1562-2102° F.) in ten seconds or less. Alternatively, the steel plate may be heated by the heating coil to the same peak temperature range in six seconds or less, or still further, in four seconds or less, as desired.

Following rapid induction heating, the heated steel plate travels for between two and ten seconds. Alternatively, the heated steel plate may travel for between two and six seconds. During this time, no additional heat or other energy may be imparted to the steel plate, other than to maintain temperature; nor is the steel plate subjected to any cooling method, other than exposure to the ambient atmosphere other than to maintain temperature. For purposes of this disclosure, such time period is referred to as holding the heated steel composition at the peak temperature range, although it is expected that the steel plate will cool slightly during this period as it is no longer being heated by the induction heater 310. According to a further embodiment, the heated steel composition may be held at the peak temperature range for between two and sixty seconds. Alternatively, the heated steel composition may be held at the peak temperature range for between two and thirty seconds.

The heated steel plate then is subjected to a quenching operation as it passes through a quench head 320 where a quench medium is flowed over the steel plate at a rate of up to 900 gallons per minute (3400 L/min). The quenching operation decreases the temperature of the steel plate from the peak temperature range of between 850° C. and 1150° C. (1562-2102° F.) to a temperature below 100° C. (212° F.) at a temperature reduction rate of between 400° C. per second and 3000° C. per second (752-5432° F./sec). The quench medium, which in one instance may be water, is recycled through a quench media storage tank 325 located adjacent the heat treatment unit 300. In addition to water, other quench media capable of achieving temperature reduction rates of 400-3000° C. (752-5432° F.) may also be employed.

While little quench media will remain on the steel plate following quenching, it is desirable to reduce, if not eliminate, any residual quench media on the steel plate prior to induction tempering by techniques such as mechanical wiping, forced air blowing, either alone or in combination. Accordingly, a quench medium reduction unit 330 is provided in the heat treatment unit 300 following the quench head 320. The quench medium reduction unit 330 may include wipers 332, air knives 334, and other drying apparatuses, either alone or in combination, so as to reduce the residual quench media on the steel plate prior to induction tempering. As the leading edge portions of the quenched steel plate passes through the quench medium reduction unit, the steel plate enters the exit pinch rolls 304, which serve to guide the steel plate through the induction tempering coil 340 and onto the exit conveyor 240. Optionally, both the entrance pinch rolls 302 and the exit pinch rolls 304 may contain spaced circumferential grooves, preferably equally spaced corresponding to the spaced welds along the width of the steel plates. Such circumferential grooves may provide relief into which any material built up during the welding operation may be recessed as the welded portion of the steel plate passes between the pinch rolls 302 or 304. The quenching step is performed in more than 1 second and not more than 20 seconds.

After the residual quench media has been removed from the steel plate, the steel plate is then passed through an induction tempering coil 340 to reduce any internal stresses that may have been introduced during quenching. As with the induction heating coil 310, the induction tempering coil 340 may optionally be encased in concrete or other non-conductive material in order to minimize damage to the coil as possible misaligned steel plates passes through the coil.

During the tempering step, the steel plate to form the steel article is heated to a temperature between 100° C. and 260° C. (212-500° F.) and tempered for a period less than ninety minutes. Three methods of tempering are contemplated. In an oven tempering process, the steel article is heated to the desired temperature for less than 90 minutes and preferably less than 30 minutes. In an induction tempering process, the steel article is heated to the temperature range for less than 10 minutes and preferably less than 2 minutes. In a combination induction and oven tempering process, the steel article may be heated to the desired temperature for less than 60 minutes and preferably more than 30 minutes. As with the induction heating coil 310, the induction tempering coil 340 is powered by its own distinct power supply, i.e. induction tempering coil power supply 345, located proximate the heat treatment system 100. Following tempering, the tempered steel plate is then discharged onto the exit conveyor 240, which is provided with a cutting device 230.

The cutting device 230 may be a plasma torch, an oxy-fuel torch, or other cutting apparatus which may be affixed to an articulated robotic arm configured to cut the moving steel plate into desired lengths as the plate travels down the exit conveyor 240. A plasma cutting robot 230 may have two cutting and vision programs within its main program. At the start of each run, the vision system 235 seeks the front edge of the steel plate. Once the front edge is detected, the cutting robot 230 utilizes an encoder wheel that counts the steel plate movement along the conveyor 240 and makes lead rip cuts at steel plate lengths. After the program has made one lead cut, the vision system programs identifies a welded seam and the plasma robot 230 cuts the steel plate on that seam across its width, and then waits, tracking the steel plate movement along the conveyor with the encoder wheel to make another lead rip cut before switching back to the vision system to identify the next welded seam and making the next cut. This process continues for the duration of a run as steel plate is cut into substantially rectangular lengths at least at the seams while the steel plate continuously moves along the conveyor. In one example, the steel plate may be cut into four feet (1.2 m) wide by ten feet (3.0 m) long segments, although other lengths and widths may also be desirable depending upon the ultimate application for the steel article.

Following cutting, the tempered steel plate is air cooled as it passes down the exit conveyor to reach a temperature of less than 93° C. (200° F.). The steel articles may then be stacked into a stack by a stacker 250 and subsequently transported to another location.

Figure 6:
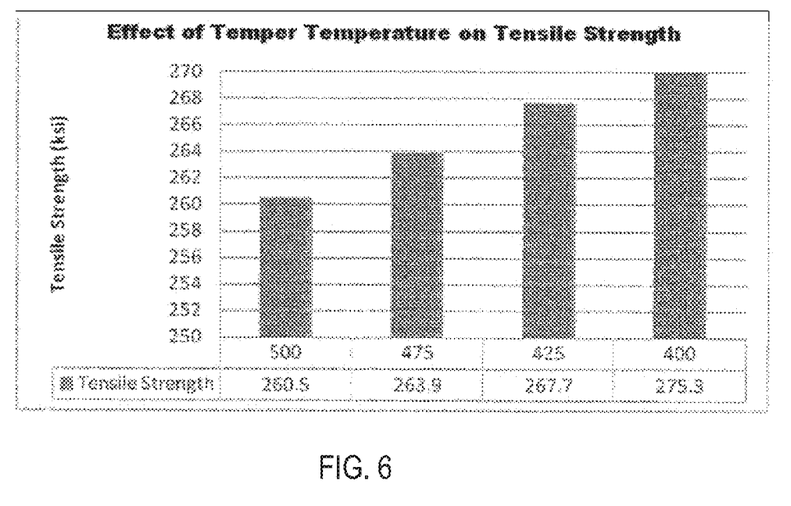
FIG. 6 is a chart showing the effect of post-quench tempering temperature on tensile strength on a steel article treated according to the disclosed method.
Figure 9:
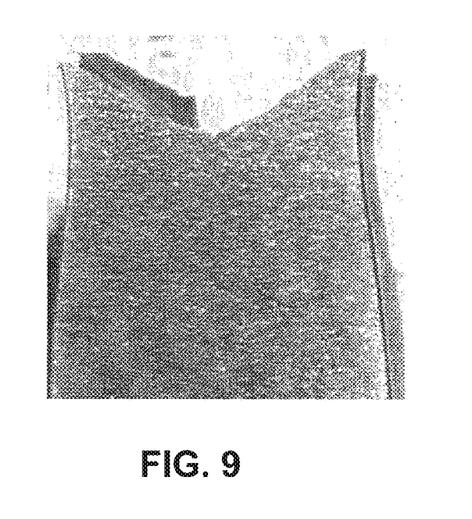
FIG. 9 is a photograph showing a cross-section of another steel article treated according to the disclosed method following fracture in a tensile test.
Figure 10:
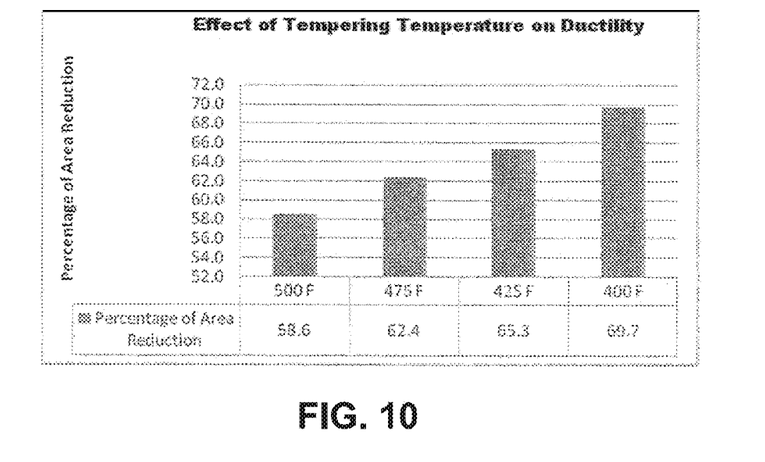
FIG. 10 is a chart showing the effect of post-quench tempering temperature on ductility on a steel article treated according to the disclosed method.

Following heat treatment and quenching as described above, the mechanical properties of the steel article may be tailored to desired specifications by changing the tempering temperature of the process between 100° C. and 260° C. (212° F.-500° F.). As shown in FIG. 6, we have found an indirect relationship between tensile strength and tempering temperature. For example, tempering at 260° C. (500° F.) resulted in tensile strength of 260.5 ksi (1796 MPa), while tempering at 200° C. (about 400° F.) resulted in a tensile strength of 275.3 ksi (1898 MPa), a difference of 14.8 ksi (102 MPa) or approximately 5%. Turning to FIG. 9, the relationship between percent elongation and tempering temperature is indicated. Notably, increasing the tempering temperature from 200° C. to 220° C. (about 400-425° F.) decreased the percent elongation of the treated steel samples, but further increases in the tempering temperature increased the percentage of elongation at 260° C. (500° F.) tempering temperature was the same as the percentage of elongation observed in the sample tempered at 204° C. (400° F.).

Figure 7:
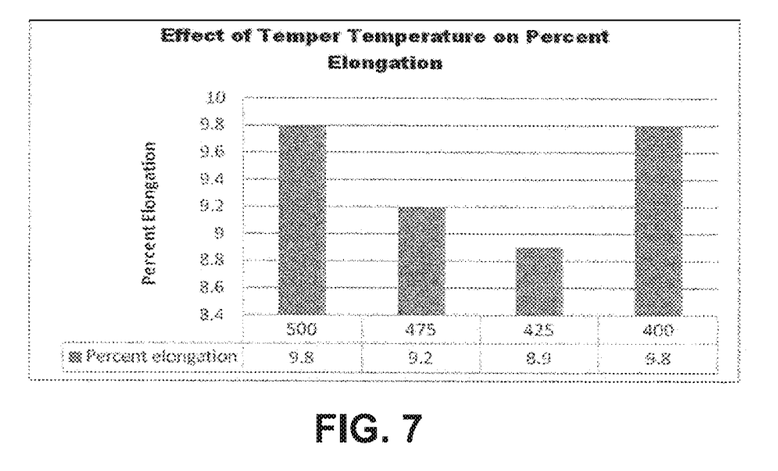
FIG. 7 is a chart showing the effect of post-quench tempering temperature on percent elongation on a steel article treated according to the disclosed method.
Figure 8:
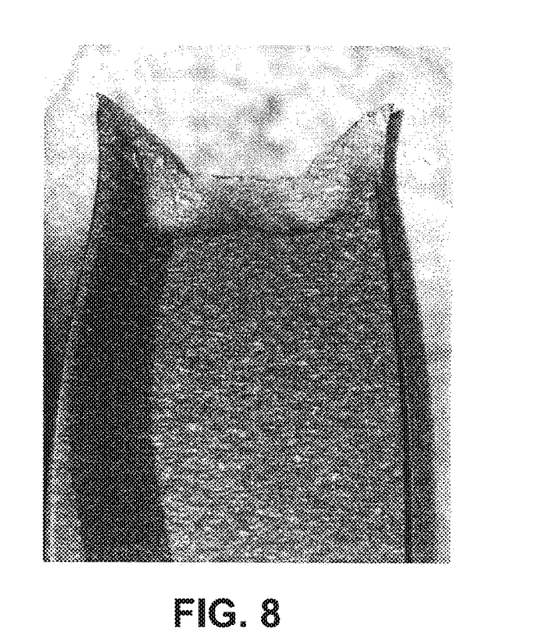
FIG. 8 is a photograph showing a cross-section of a steel article treated according to the disclosed method following fracture in a tensile test.

The ductility was evaluated again after induction tempering at temperatures between 204° C. and 260° C. (400-500° F.) using a test method based on the ASTM E-8 method for ductility determination. In this method the ductility measurement, designated as the percentage of area reduction, is represented as the ratio of the cross-sectional area of the sample at the tensile break to the original cross-sectional area times 100. Thus, a lower percentage represents an increased amount of ductility. The 204° C. (400° F.) and 260° C. (500° F.) temper annealed samples, represented in FIGS. 6 and 7, show that in contrast to the percent elongation measured during the tensile testing there was a direct relationship between the temper temperature and the percentage in area reduction, i.e., tempering at 260° C. (500° F.) temperatures resulted a lower percentage in area reduction (58.6%) than tempering at 204° C. (400° F.) (69.7% area reduction).

The steel article formed and treated by the disclosed method may be employed in armor applications. In particular, the steel article formed and treated by the disclosed method has also been subjected to ballistics testing according to standards set forth in MIL-DTL-32332, MIL-DTL-46100E, MIL-DTL-12560J (classes 1 and 4), as well as NH threat level 3. The results from such ballistics testing of the steel article are tabulated in Table 1. The results show comparison of a 0.25 inch (6.35 mm) thick sample of AISI 4130 steel treated by the presently disclosed method compared to other standard materials used in armor applications.

TABLE 1

| Material | Thickness (inches) | (V50 protection ballistic limit (fps)) | |
|---|---|---|---|
| | | .030-cal M2AP @ 30 deg. | 20 mm FSP @ 0 deg. |
| 4130 Steel Treated By Disclosed Process | 0.250 | 2461 | 1800 |
| RHA 360 Hb | 0.250 | 2100 | 1544 |
| HighHard 500 Hb | 0.250 | 2300-2400 | <1500 est. |
| 5083 Al | 0.733 | — | 1200 |
| 5059 Al | 0.733 | 1840 | 1200 |
| MgAz31B-H24 | 1.125 | No Data | 1300 |
| Ti—6Al—4V | 0.444 | No Data | 1550 |

For purposes of this disclosure, the $V_{50}$ protection ballistic limit is defined as the average of six fair impact velocities comprising the three lowest velocities resulting in complete penetration and the three highest velocities resulting in partial penetration of the test specimen, as further explained in MIL-DTL-32332 and MIL-DTL-46100E (MR) with Amendment 1 of 24 Oct. 2008, which is incorporated by reference in its entirety herein. Table 1 shows that steel plate formed and treated by the presently disclosed method exhibits $V_{50}$ values which are the same as or exceed $V_{50}$ values for the comparative materials of similar thickness. As such, it may be possible to use a relatively thinner cladding of steel plate formed and treated by the current method to achieve at least the same level of ballistic protection. Therefore, the weight of a vehicle clad with steel articles treated by the disclosed method may be relatively lighter as compared to vehicles clad with the comparative armor materials. Thus, steel articles formed and treated by the present method may result in relatively improved fuel economy, transportability, maneuverability, and other benefits of a generally lighter weight vehicle. Such data is summarized below in Table 2, which shows the thickness in inches required for each of the tested steel plate to achieve passing ballistics results for a 2100 feet per second (640 m/s) projectile and the corresponding pounds per square foot for each armor material for the required thicknesses.

TABLE 2

| Material | 10.2 psf V50 in fps | 10.2 psf Thickness |
|---|---|---|
| 4130 Steel Treated By Disclosed Process | 2255 | 0.250" |
| RHA 360 Hb | 1700 | 0.250" |
| HighHard 500 Hb | 1640 | 0.250" |
| 5083 Al | 1625 | 0.733" |
| 5059 Al | 1675 (est) | .0733" |
| MgAz31B-H24 | 1650 | 1.125" |
| Ti—6Al—4V | 1910 | 0.444" |

Figure 11:
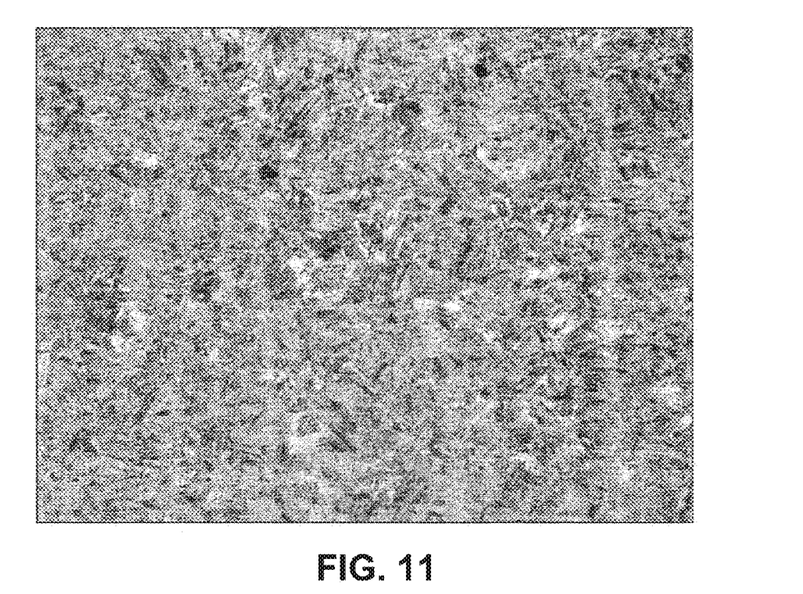
FIG. 11 is a photomicrograph showing the microstructure of a steel article treated according to the disclosed method.
Figure 12:
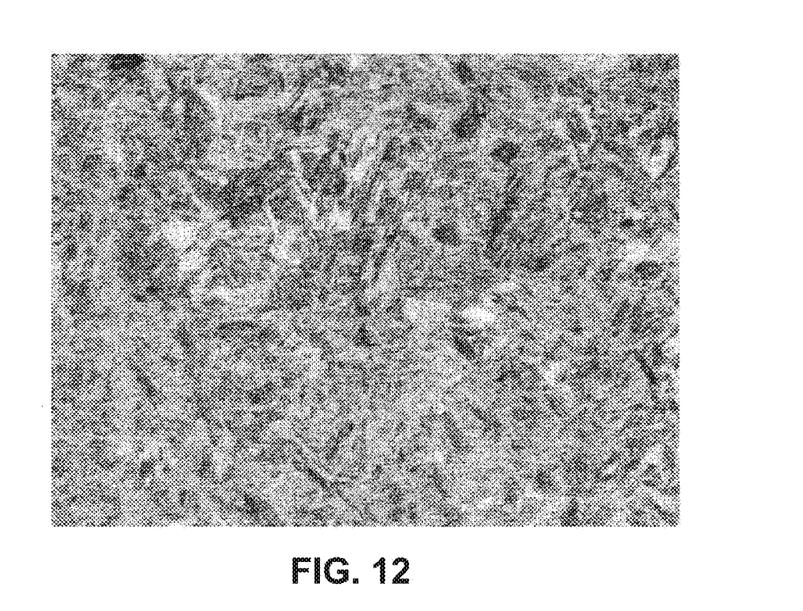
FIG. 12 is a photomicrograph showing the microstructure of a steel article treated according to the disclosed method.
Figure 13:
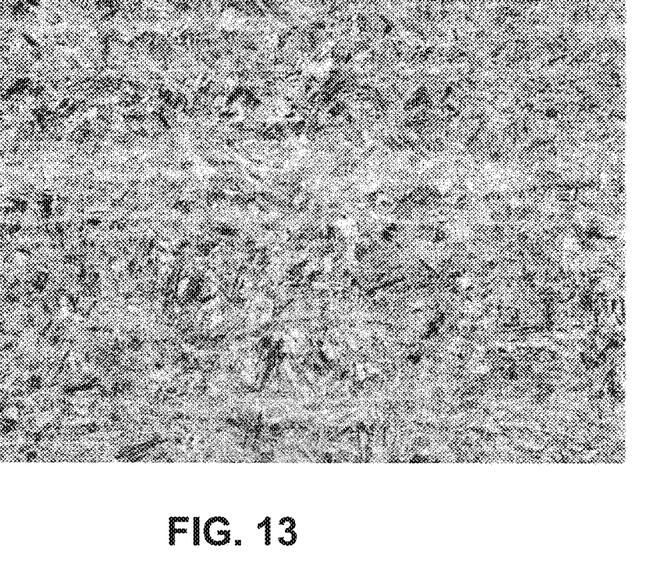
FIG. 13 is a photomicrograph showing the microstructure of a steel article treated according to the disclosed method.
Figure 14:
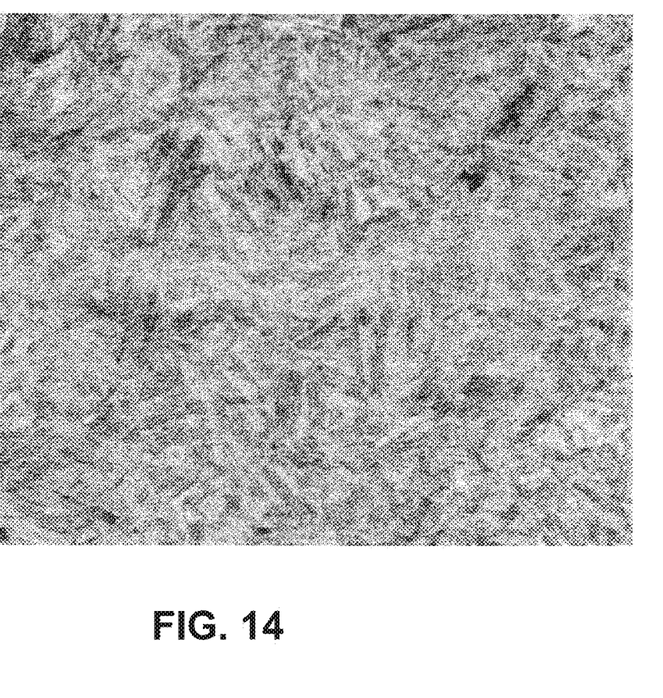
FIG. 14 is a photomicrograph showing the microstructure of a steel article treated according to the disclosed method.

The microstructure of steel article has a direct relationship on the mechanical properties. Accordingly, the microstructure of the steel specimens formed and treated by the disclosed method were also examined, both before and after heat treatment. FIG. 5 shows the initial microstructure of the starting material for the steel article prior to treatment is ferrite and pearlite. Following formation and treatment by the disclosed method, the microstructure of the steel article may be 80 percent or more martensite and 5 percent or less bainite, and may approach 100 percent martensite. FIGS. 11 and 12 show the microstructure of steel article formed and tempered at 260° C. (500° F.) as described above after nital etching at 500 and 1000 times magnification, respectively. Similarly, FIGS. 13 and 14 show the microstructure of steel article formed and tempered at 204° C. (400° F.) after nital etching at 500 and 1000 times magnification, respectively. In both instances, the analysis shows that the microstructure of the samples of the steel article consisted of almost entirely of martensite.

While the invention has been described with reference to certain embodiments it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments falling within the scope of the appended claims.

What is claimed:

1. A method for treating a steel article to form a high yield strength and ductile alloy comprising the steps of:
   (a) providing a steel composition having a material thickness less than 0.5 inches (12.7 mm), having an initial microstructure of ferrite and pearlite, and having a composition of, by weight,
   carbon between 0.25 and 0.55%
   silicon between 0.15 and 0.35%,
   manganese between 0.40 and 1.0%,
   chromium between 0.80 and 1.10%,
   molybdenum between 0.15 and 0.25%,
   sulfur less than 0.040%,
   phosphorus less than 0.035%;
   balance with iron and other elements and compounds in making steel;
   (b) preheating the provided steel composition at least 0.7° C. (33.3° F.) per second to not more than 538° C. (1000° F.);
   (c) heating the preheated steel composition to a peak temperature of between 850° C. (1562° F.) and 1150° C. (2102° F.) in less than ten seconds;
   (d) holding the heated steel composition at the peak temperature range for between two and ten seconds;
   (e) quenching the heated steel composition from the peak temperature range to below 100° C. (212° F.) at a temperature rate reduction of between 400 and 3000° C./sec (752-5432° F./sec);
   (f) removing residual quench media from the surface of the quenched steel composition;
   (g) tempering the quenched steel composition at a temperature from 100° C. to 260° C. (212-500° F.) for less than ninety minutes;
   (h) air cooling the tempered steel composition to less than 100° C. (212° F.) to form a steel article having at least 80% martensite and up to 5% bainite by volume, a yield strength of at least 1800 MPa, a total elongation between 5% and 12%, and having a $V_{50}$ protection ballistic limit at 30° obliquity angle between 2300 and 2510 feet per second (701-765 m/s) with a .30 caliber armor piercing round for a thickness of 0.25 inches (6.35 mm).

2. A method for treating a steel article to form a high yield strength and ductile alloy comprising the steps of:
   (a) providing a steel composition having a material thickness less than 0.5 inches (12.7 mm), having an initial microstructure of ferrite and pearlite, and having a composition of, by weight,
   carbon between 0.25 and 0.55%
   silicon between 0.15 and 0.35%,
   manganese between 0.40 and 1.0%,
   chromium between 0.80 and 1.10%,
   molybdenum between 0.15 and 0.25%,
   sulfur less than 0.040%,
   phosphorus less than 0.035%,
   balance with iron and other elements and compounds in making steel;
   (b) preheating the provided steel composition at least 0.7° C. (33.3° F.) per second to between the austenization temperature and 815° C. (1500° F.);
   (c) heating the preheated steel composition to a peak temperature between 850-1150° C. (1562-2102° F.) in less than ten seconds;
   (d) holding the heated steel composition at the peak temperature range for between two and ten seconds;
   (e) quenching the heated steel composition to below 100° C. (212° F.) in less than four seconds;
   (f) removing residual quench media from the surface of the quenched steel composition;
   (g) tempering the quenched steel composition at a temperature between 100° C. and 260° C. (212-500° F.) for less than ninety minutes;
   (h) air cooling the tempered steel composition to less than 100° C. (212° F.) having a transformed microstructure of at least 80% martensite and up to 5% bainite by volume, a yield strength of at least 1800 MPa, and a total elongation between 5% and 12%.

3. A method for treating a steel article to form a high yield strength and ductile alloy comprising the steps of:
   (a) providing a steel composition having a material thickness less than 0.5 inches (12.7 mm), having an initial microstructure of ferrite and pearlite, and having a composition of, by weight, carbon between 0.25 and 0.55%
silicon between 0.15 and 0.35%,
manganese between 0.40 and 1.0%,
chromium between 0.80 and 1.10%,
molybdenum between 0.15 and 0.25%,
sulfur less than 0.040%,
phosphorus less than 0.035%,
balance with iron and other elements and compounds in making steel;
(b) preheating the provided steel composition to a temperature between 260° C. (500° F.) and 538° C. (1000° F.)
(c) heating the preheated steel composition to a peak temperature of between 850° C. (1562° F.) and 1150° C. (2102° F.) in less than ten seconds;
(d) holding the heated steel composition at the peak temperature range for between two and sixty seconds;
(e) quenching the heated steel composition from the peak temperature range to below 100° C. (212° F.) at a temperature rate reduction of between 400 and 3000° C./sec (752-5432° F./sec);
(f) removing residual quench media from the surface of the quenched steel composition;
(g) tempering the quenched steel composition at a temperature from 100° C. to 260° C. (212-500° F.) for less than ninety minutes;
(h) air cooling the tempered steel composition to less than 100° C. (212° F.) to form a steel article having at least 80% martensite and up to 5% bainite by volume, a yield strength of at least 1800 MPa, a total elongation between 5% and 12%, and having a $V_{50}$ protection ballistic limit at 30° obliquity angle between 2300 and 2510 feet per second (701-765 m/s) with a .30 caliber armor piercing round for a thickness of 0.25 inches (6.35 mm).

4. A method for treating a steel article to form a high yield strength and ductile alloy comprising the steps of:
(a) providing a steel composition having a material thickness less than 0.5 inches (12.7 mm), having an initial microstructure of ferrite and pearlite, and having a composition of, by weight,
carbon between 0.25 and 0.55%
silicon between 0.15 and 0.35%,
manganese between 0.40 and 1.0%,
chromium between 0.80 and 1.10%,
molybdenum between 0.15 and 0.25%,
sulfur less than 0.040%,
phosphorus less than 0.035%,
balance with iron and other elements and compounds in making steel;
(b) preheating the provided steel composition at least 0.7° C. (33.3° F.) per second to not more than 538° C. (1000° F.);
(c) heating the preheated steel composition to a peak temperature between 850-1150° C. (1562-2102° F.) in less than ten seconds;
(d) holding the heated steel composition at the peak temperature range for between two and sixty seconds;
(e) quenching the heated steel composition to below 100° C. (212° F.) in less than four seconds;
(f) removing residual quench media from the surface of the quenched steel composition;
(g) tempering the quenched steel composition at a temperature between 100° C. and 260° C. (212-500° F.) for less than ninety minutes;
(h) air cooling the tempered steel composition to less than 100° C. (212° F.) having a transformed microstructure of at least 80% martensite and up to 5% bainite by volume, a yield strength of at least 1800 MPa, and a total elongation between 5% and 12%.

5. The method for treating a steel article as claimed in claim 4, where the air cooled tempered steel composition has a $V_{50}$ protection ballistic limit at 30° obliquity angle between 2300 and 2510 feet per second (701-765 m/s) with a .30 caliber armor piercing round for a thickness of 0.25 inches (6.35 mm).

6. The method for treating a steel article as claimed in claim 4, where the steel composition is heated in step (c) in less than eight seconds.

7. The method for treating a steel article as claimed in claim 6, where the steel is heated in step (c) in less than six seconds.

8. The method for treating a steel article as claimed in claim 4, where the heated steel composition is held at the peak temperature range for between two and six seconds.

9. The method for treating a steel article as claimed in claim 4, where the heated steel composition is quenched from the peak temperature range to below 50° C. (122° F.) at a temperature rate reduction of between 400 and 3000° C./sec (752-5432° F./sec).

10. The method for treating a steel article as claimed in claim 4, where the residual quench media is removed from the surface of the quenched steel composition by at least one of mechanical wiping, blown air, and combinations thereof.

11. The method for treating a steel article as claimed in claim 4, where the tempering step is performed using an oven.

12. The method for treating a steel article as claimed in claim 4, where the tempering step is performed using a combination of oven and induction heater.

13. The method for treating a steel article as claimed in claim 4 where the tempering step is performed using an induction heater.

14. The method for treating a steel article as claimed in claim 4 where the tempering step is performed at between 100° C. (212° F.) and 260° C. (500° F.) in a time between 1 and 10 seconds.

15. The method for treating a steel article as claimed in claim 4 where the steel composition has, by weight,
carbon between 0.25 and 0.40%.

16. The method for treating a steel article as claimed in claim 4 where the steel composition has, by weight,
carbon between 0.40 and 0.55%.

17. The method for treating a steel article as claimed in claim 4 where the heating step is performed using an induction heater.

18. The method for treating a steel article as claimed in claim 4 where the quenching step is performed by flowing a quench medium over the steel article at a rate of up to 900 gallons/min (3400 L/min).

19. The method for treating a steel article as claimed in claim 18 where the quench medium is water.

20. The method for treating a steel article as claimed in claim 18 where the quenching step is performed in more than 1 second and not more than 20 seconds.

21. The method for treating a steel article as claimed in claim 4 further comprising the step of, prior to heating the steel composition, welding together two lengths of steel plate along the width with one or more welds to form a continuous series of steel plates.

22. The method for treating a steel article as claimed in claim 21 where an indicia is applied to the steel plate in advance of the welding step to enable a vision system to identify the location of end portions of lengths of the steel plates for the welding step.

23. The method for treating a steel article as claimed in claim 21 where the step of welding includes applying a weave weld bridging between lengths of steel plate across the width of the steel plates.

24. The method for treating a steel article as claimed in claim 23 where after at least step (g) the steel plate is cut into lengths at least at the seams while the steel plate continuously moves along the conveyor.

25. The method for treating a steel article as claimed in claim 23 where in addition a seam weld is applied over the weave weld across the width of the steel plates.

26. The method for treating a steel article as claimed in claim 23 with the step of welding includes applying a weave weld bridging between lengths of steel plate in three sections where the center portion of steel plate is done first and the side portions are welded to provide a weave weld across the width of the steel plates.

27. The method for treating a steel article as claimed in claim 26 where in addition a seam weld is applied over the weave weld across the width of the steel plates.

\* \* \* \* \*

UNITED STATES PATENT AND TRADEMARK OFFICE
CERTIFICATE OF CORRECTION

| | | |
|---|---|---|
| PATENT NO. | : 8,894,781 B2 | Page 1 of 1 |
| APPLICATION NO. | : 13/949645 | |
| DATED | : November 25, 2014 | |
| INVENTOR(S) | : John Batiste et al. | |

It is certified that error appears in the above-identified patent and that said Letters Patent is hereby corrected as shown below:

IN THE SPECIFICATION:

Column 5, line 40, "and 4150 and the 86XX (family such as 8630 and 8640 may be used." should read --and 4150 and the 86XX family such as 8630 and 8640 may be used.--.

Column 10, line 32, "as well as NH threat level 3." should read --as well as NIJ threat level 3--.

Signed and Sealed this
Seventeenth Day of March, 2015

Michelle K. Lee
*Director of the United States Patent and Trademark Office*